United States Patent
Havekost et al.

(10) Patent No.: US 6,871,299 B2
(45) Date of Patent: Mar. 22, 2005

(54) HIERARCHICAL FAILURE MANAGEMENT FOR PROCESS CONTROL SYSTEMS

(75) Inventors: Robert B. Havekost, Austin, TX (US); David L. Deitz, Austin, TX (US); Dennis L. Stevenson, Round Rock, TX (US); William G. Irwin, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 616 days.

(21) Appl. No.: 09/777,225

(22) Filed: Feb. 5, 2001

(65) Prior Publication Data

US 2002/0108077 A1 Aug. 8, 2002

(51) Int. Cl.$^7$ ................................................ G06F 11/00
(52) U.S. Cl. ............................ 714/47; 714/43; 714/31; 700/21; 700/283
(58) Field of Search .............................. 714/47, 43, 31; 700/20, 21, 108, 283, 79

(56) References Cited

U.S. PATENT DOCUMENTS

| | | | |
|---|---|---|---|
| 4,380,067 A | * 4/1983 | Beardsley et al. | 714/4 |
| 4,633,467 A | * 12/1986 | Abel et al. | 714/45 |
| 5,161,110 A | * 11/1992 | Dorchak | 700/108 |
| 5,522,026 A | 5/1996 | Records et al. | 395/161 |
| 6,203,183 B1 | * 3/2001 | Mordaunt et al. | 366/138 |
| 6,314,328 B1 | * 11/2001 | Powell | 700/80 |
| 6,535,769 B1 | * 3/2003 | Konar | 700/14 |

FOREIGN PATENT DOCUMENTS

| | | | |
|---|---|---|---|
| DE | 43 01 968 | 7/1994 | F02D/41/22 |
| JP | 2002118672 | 4/2002 | H04M/11/00 |

OTHER PUBLICATIONS

Patnaik, Saroj K., *What is S95?—For the Pharmaceutical Industry*, dated Apr. 27, 2000, 15 pages.
UK Search Report dated Aug. 7, 2002.

* cited by examiner

*Primary Examiner*—Robert Beausoliel
*Assistant Examiner*—Christopher McCarthy
(74) *Attorney, Agent, or Firm*—Marshall, Gerstein & Borun LLP (57) ABSTRACT

A hierarchical failure management technique uses an integrated equipment hierarchy to automatically pass failure information from control modules to unit modules. Each control module collects failure information and generates a composite failure code by mathematically combining the failure information collected by that module. Modules which are currently needed by a phase of the unit module to carry out a process automatically send respective failure codes to the unit module. The unit module selects the worst failure code from a list of failure codes within the unit module and compares the selected worst failure code to a predetermined threshold value to determine whether the process should continue.

39 Claims, 7 Drawing Sheets

HIERARCHICAL FAILURE MANAGEMENT FOR PROCESS CONTROL SYSTEMS

FIELD OF THE INVENTION

The invention relates generally to process control systems and, more specifically, to a technique that uses an integrated equipment hierarchy to automatically manage failure information within a process control system.

DESCRIPTION OF THE RELATED ART

Process control systems, such as those that use batch processing techniques to produce large quantities of pharmaceuticals, chemicals, beverages, paint, or any other product, generally include one or more centralized process controllers communicatively coupled to one or more field devices which may be, for example, valve positioners, switches, sensors (such as temperature, pressure and flow rate sensors), etc. These field devices may be associated with control equipment such as, for example, valves, pumps, mixing units, etc., may perform physical control functions (such as opening or closing a valve, turning a pump or mixing unit on and off, etc.) within a process control system, may take measurements within the process control system for use in controlling the operation of the process or may perform any other desired function within the process control system. Generally speaking, the process controllers receive signals indicative of measurements made by one or more field devices and/or other information pertaining to the field devices, use this information to implement a control routine and generate control signals that are sent via signal lines or buses to the field devices to control the operation of the process control system.

Furthermore, the process controllers are generally coupled via a data highway, such as an Ethernet bus, to one or more workstations and other devices. These other devices run other applications or programs that use the information provided by the one or more controllers to provide other process control functions, such as providing a user interface to the control routine, enabling modification or updating of the control routine, interfacing with the field devices, storing historical process control data, controlling or restricting user access, etc. In some large process control systems, one or more workstations located at a remote site may be coupled to the data highway via a further communication network, such as an Internet connection, a satellite or cellular communication link, a radio link (as used in wireless Ethernet connections), etc.

Process control systems typically include failure monitoring logic that reports process control errors and device or equipment failures (e.g., a failed sensor, a stuck valve, etc.) to the system operator. In some process control systems, process control errors, device failures or any other failure information may, for example, be displayed to the operator via a graphical user interface. In these process control systems, the system operator may see a depiction within the graphical user interface indicating that a critical device has failed or that some process variable has deviated outside of an acceptable operating range. In response to these displayed failures, the system operator may choose to intervene to stop the process from continuing and may take further steps to diagnose the failure so that appropriate corrective action can be taken. In the case of a process control system that is executing a batch process, it may be necessary to stop the process to prevent the system from producing an inferior and/or a dangerous product batch.

In some other process control systems, a more complex failure management scheme may be used to supplement or to replace manual monitoring and intervention by system operators or users. For example, in a process control system that produces pharmaceuticals, the sensors, actuators, and other devices distributed throughout the system may be continuously monitored and if any one of the sensors or related control parameters falls outside of an acceptable operating range, the process control system may automatically stop the process. In response to an automatic stoppage of the process, the system operator may take steps to diagnose the failure and if the failure is non-critical or would not otherwise impair the production of an acceptable final product, the operator may cause the system to resume execution of the process. Alternatively, if the operator determines that the failure requires a repair, calibration, or some other corrective action, the operator may request the dispatch of a field technician or maintenance person to remedy the failure before resuming execution of the batch process.

Due to the large number of inputs, outputs, process control variables, etc. that are typically used by process control systems, the software that controls the operations of a process control system is commonly implemented using software objects, which are typically created using well-known object-oriented programming techniques. These software objects may be developed using a hierarchical model of the process control system that simplifies the creation of a highly complex process control routine or algorithm which will be executed by the process control system. For example, one commonly used hierarchical model uses unit modules and control modules. A unit module or unit typically represents a particular piece of physical equipment within the process control system such as, for example, a mixing tank having a variety of inlet valves, outlet valves, level sensors, blenders, etc. that enable various actions to be performed within the tank. A control module, on the other hand, typically represents control software (i.e., subroutines, objects, etc.) that may be instantiated to carry out low-level regulatory control functions or actions as directed by one or more units.

Unfortunately, while the above-noted hierarchical model for a process control system can facilitate the development of a complex process control algorithm, this conventional hierarchical model typically does not establish any run-time communication relationships between unit modules and control modules. As a result, a unit module typically does not have knowledge of what control modules are subservient to that unit module. Further, this conventional hierarchical model typically does not provide any mechanism for automatically propagating failure information (i.e., equipment failures, device failures, control parameter errors, etc.) from subordinate control modules to parent unit modules. Still further, this conventional hierarchical model typically does not provide any mechanism by which the unit modules can register interest in or, conversely, ignore specific types of failure information from one or more control modules at specific times (e.g., when those control modules are not needed to perform the portion of the process control algorithm currently being executed).

The lack of run-time communication relationships between unit modules and control modules found in process control systems based on the above-noted conventional hierarchical model may compel system designers to use relatively complex failure management routines within high-level executory functions or unit level functions that have access to the failure information distributed throughout a process control system. Typically, these complex failure management routines reside within a batch executive function or a unit procedure and directly manage enormous amounts failure information provided by the hundreds of devices which are typically distributed throughout a process control system.

Furthermore, because conventional process control systems typically do not allow failure information to be automatically propagated from control modules to unit modules, conventional failure management techniques typically continuously monitor the hundreds of devices distributed throughout the process control system, regardless of whether or not a device being monitored is needed at that particular time (or at any time) by the process control algorithm being executed. For example, a process control system that produces pharmaceuticals may include a large number of devices such as sensors, actuators, etc. which may be used in various combinations to produce a number of different pharmaceutical products. However, for any particular pharmaceutical product, which may be produced using a particular batch process, only a subset of all the available devices may be needed (i.e., some of the devices may not be used at all). In any event, the continuous monitoring of all the devices distributed throughout a process control system generates an enormous amount of failure information. As a result, the development of failure management logic, which processes this enormous amount of failure information, and which may automatically take action based on one or more failure conditions (e.g., to stop a batch process and notify the system operator of the failures), becomes very complex and time consuming to implement for process control systems of even moderate complexity.

Additionally, conventional failure management techniques usually respond to failure information that indicates a failure has occurred by stopping the process and waiting for the system operator to take appropriate corrective action, regardless of the nature or severity of the failure. Typically, the batch process may be resumed when the system operator indicates that the condition resulting in the failure has been eliminated and commands the system to resume operation.

Thus, conventional failure management techniques may result in unnecessary stoppages of a process because errors associated with devices that are not currently needed, or which are not needed at all, by the process can cause a stoppage. Additionally, unnecessary stoppages may result when one or more devices used by the process being executed exhibits a failure condition that is not critical to, or which would not adversely affect the results of the process. For example, the failure of one of a pair of redundant sensors could result in an unnecessary stoppage of the process control system.

SUMMARY OF THE INVENTION

A hierarchical failure management technique establishes run-time communication relationships between unit modules and control modules within a process control system so that failure information may be automatically passed from control modules to unit modules during execution of a process. More specifically, the hierarchical failure management technique described herein uses the run-time communication relationships between unit modules and control modules to enable a unit module to register interest in and to automatically receive and process failure information from control modules that are needed by the unit module to carry out a current phase or step of a process control algorithm and to ignore failure information associated with control modules that are not currently needed by the unit module to carry out a phase or step.

Additionally, the hierarchical failure management technique described herein uses control modules that collect failure information and generate composite failure codes therefrom. Each of these composite failure codes may, for example, represent a weighted summation of the operational statuses or failures of the various sensors, control loops, equipment, etc. used by a control module to carry out its function. These composite failure codes may be indicative of the type and the collective severity of the failures within the control module and/or within the devices which are used by the control module to carry out its function. Each control module may send its composite failure code to a unit module that is currently requesting failure information from that control module, thereby enabling the unit module to process composite failure codes quickly to determine whether or not the process can proceed, whether or not any field inspection/repair may be needed, etc. In this manner, the hierarchical failure management technique described herein eliminates or reduces the need for unit modules or higher level executory functions within a process control system (such as, e.g., a batch executive) to directly and continuously monitor failure information from all of the devices, equipment, etc. that are distributed throughout the process control system, as was the case with prior failure management techniques. Instead, the hierarchical failure management technique described herein automatically passes a relatively small amount of composite failure information from control modules to unit modules at times when that failure information is needed by the unit modules. The unit modules may then determine, based on the type and collective severity of the failure affecting the control modules needed to carry out the process as directed by the unit modules, whether a phase or step within a phase can proceed, thereby minimizing or eliminating unnecessary stoppages of a process.

According to one aspect of the invention, a system and method for managing failures in a process control system collects failure information within each of a plurality of control modules and generates a composite failure code within each of the control modules based on the failure information collected by that control module. Additionally, the system and method automatically sends a group of composite failure codes to a unit module and determines whether a process should be stopped based on the group of composite failure codes.

In accordance with another aspect of the invention, a method of managing failures in a process control system collects failure information within a control module and generates a composite failure code within the control module based on the failure information collected by the control module. Additionally, the method automatically sends the composite failure code to a unit module and determines whether a process should be stopped based on the composite failure code.

In accordance with still another aspect of the invention, a device that manages failures in a process control system includes a controller having a memory and a processor communicatively coupled to the memory. The controller is programmed to use composite failure codes to determine whether a process should be stopped.

DESCRIPTION OF THE PREFERRED EMBODIMENTS

While a hierarchical failure management technique is described in conjunction with a process control system that executes batch processes, the hierarchical failure management technique described herein may be advantageously used within a variety of process control systems, including, for example, process control systems that carry out substantially continuous processes such as heating and ventilation, building security, sewage treatment, power generation, etc.

Before discussing the hierarchical failure management technique in greater detail, it is important to recognize that conventional failure management techniques typically do not include any run-time mechanism by which unit modules or units automatically receive failure information from subservient control modules. Furthermore, these conventional failure management techniques typically do not process failure information in any manner prior to sending the failure information from the control modules to unit modules. Instead, these conventional techniques require a process control system designer or user to generate a relatively complex failure management routine which is difficult and time consuming to produce and that must be separately instantiated within a workstation or controller. Typically, these conventional failure management techniques process failure information associated with control activities and devices located throughout the process control system on a continuous basis. In fact, with these conventional techniques, failure information is typically processed and the system is usually stopped regardless of whether or not the devices associated with the failure information are currently needed by the process control system to carry out the process being executed and regardless of the nature or severity of the underlying failures. Thus, these conventional failure management techniques can cause an unnecessary stoppage of a process in response to the failure of a device (e.g., a sensor) that is not needed to complete the process or in response to a failure of minimal severity (e.g., a failed redundant sensor) that would not affect the results of the process.

Figure 1:
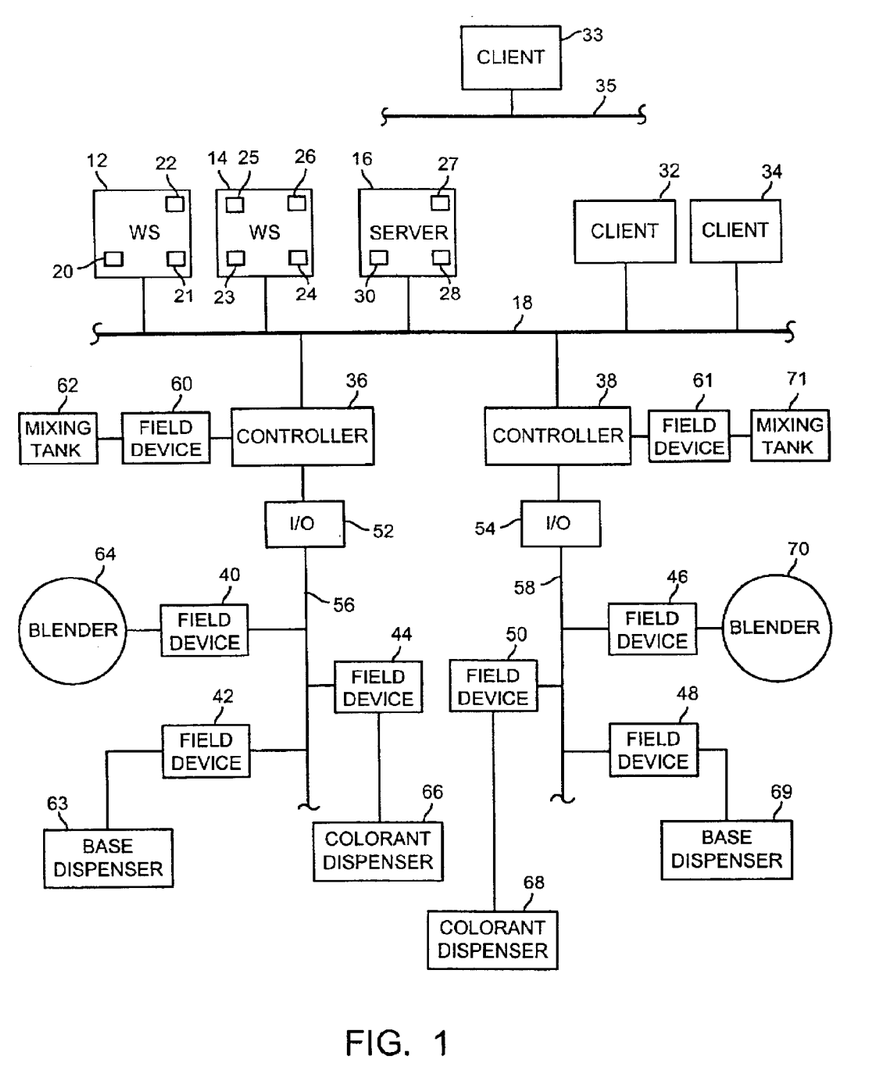
FIG. 1 is a schematic block diagram of a process control system that uses a hierarchical failure management technique while executing a batch process.

FIG. 1 is an exemplary schematic block diagram of a process control system 10 that uses a hierarchical failure management technique to automatically send composite failure codes from control modules to unit modules. By way of example only, the process control system 10 is adapted to execute batch processes and, in particular, batch processes that produce batches of paint. However, it should be understood that the failure management technique described herein may be used in any other batch processing application and, more generally, in any other process control system executing any other batch process or any continuous process.

The process control system 10 includes workstations 12 and 14 and a server 16 that are communicatively coupled via a system level databus 18, which may be an Ethernet databus or any other databus suitable for the transmission of data. The workstations 12 and 14 may be based on a personal computer platform or any other suitable processing platform and may perform a variety of known process control functions. For example, the workstation 12 may include a routine 20 stored on a memory 21 and executed by a processor 22 that performs security functions, which control user access to other functions and information within the process control system 10. Similarly, the workstation 14 may include routines 23 and 24 that are stored on a memory 25 and which are executed by a processor 26 to provide data historian and batch executive functions. Batch executive functions, such as the batch executive function that is performed by the workstation 14, enable a process control system to carry out complex sequences of control actions to produce batches of one or more types of products. For example, the batch executive function performed by the workstation 14 may enable a system operator to create and instantiate a batch process that produces one or more batches of paint within the process control system 10.

Generally speaking, the process control system 10 establishes run-time relationships between unit modules and control modules that result in the execution of a predetermined sequence of events or actions within the process control system 10. In particular, as discussed in greater detail below, unit module and control module information or routines may be downloaded to one or more controllers and/or field devices that are distributed throughout the process control system 10. Some portion or all of this downloaded information may then be instantiated, under the direction of the batch executive, in the appropriate sequence at the appropriate times to carry out the desired batch processing actions. Further, as is also discussed in greater detail below, the batch executive function may include, or may be subject to, failure management logic within unit modules that determines, based on the status of one or more devices, control parameters, etc. within the process control system 10, whether the batch processing activities should be stopped.

The server 16 may be a workstation having a processor 27 that executes one or more software routines 28 stored on a memory 30 to perform a portion of or all of the hierarchical failure management technique described herein. The server 16 may communicate with clients 32 and 34 over the system level databus 18, or alternatively, over any other suitable communication link such as a satellite-based wireless link, modem link, etc. Similarly, the server 16 may also communicate with a client 33 on another node or system via a databus 35, which may also be an Ethernet databus or any other suitable databus. The clients 32–34, may be running on any type of hardware platform such as a workstation, personal data assistant, laptop computer, etc. that can communicate with the server 16. Of course, other devices such as data storage devices, additional user interfaces, etc. (not shown) may also be connected to the system level databus 18 and/or the databus 35 associated with the other node or system.

The process control system 10 further includes first and second controllers 36 and 38, which may be distributed control system (DCS) type controllers such as, for example, DeltaV controllers commercially available from Fisher-Rosemount System, Inc., or any other type of controller. The controllers 36 and 38 may be communicatively coupled to the system level databus 18 using either a proprietary communication protocol, or any other suitable communication protocol. The controllers 36 and 38 communicate with respective field devices 40–44 and 46–50 via respective first and second input/output (I/O) devices 52 and 54 and controller databusses 56 and 58. As shown in FIG. 1, the field devices 40–50 are smart field devices that communicate information related to the process control system 10 by sending messages over the controller databusses 56 and 58. As is well known, smart field devices may be used to execute one or more process control loops either in conjunction with, or independently from a controller. The smart field devices 40–50 may be, for example, Fieldbus devices, in which case the controller databusses 56 and 58 are non-proprietary protocol databusses that use the FOUNDATION Fieldbus signal protocol. However, other types of devices and protocols such as the HART®, PROFIBUS®, WORLDFIP®, Device-Net®, CAN, and AS-Interface protocols could be used as well. Additionally, the controllers 36 and 38 may be directly connected to conventional (i.e., non-smart) field devices (e.g., field devices having a conventional analog interface such as 4–20 mA or 0–10 VDC). By way of example, the first controller 36 is connected to a conventional non-smart field device 60 and the second controller 38 is connected to a non-smart field device 61.

The field devices 40–50, 60 and 61 are connected to equipment 62–71. In particular, the non-smart field devices 60 and 61 are connected to respective mixing tanks 62 and 71, the field device 42 is connected to a first paint base dispenser 63, the field device 40 is connected to a first blender 64, the field device 44 is connected to a first colorant dispenser 66, the field device 46 is connected to a second blender 70, the field device 50 is connected to a second colorant dispenser 68, and the field device 48 is connected to a second paint base dispenser 69. Although not shown in FIG. 1, the process control system 10 may include additional controllers, field devices and equipment as needed to produce batches of paint.

In operation, failure information may be generated by one or more of the field devices 40–50, 60 and 61 in response to a control parameter falling outside of a desired or required operating range, in response to the failure of a device to perform an action, or in response to any other abnormal or unacceptable condition within the field device. For example, the field device 60 may be a level sensor that senses the level of a paint mixture within the mixing tank 62. If the measured level of the paint mixture within the tank 62 exceeds the predetermined maximum level, the controller 36 may automatically receive failure information from the field device 60 indicating that the paint mixture in tank 62 has exceeded the predetermined maximum level. Also, for example, the smart field device 44 may be a valve that enables the colorant dispenser 66 to meter controlled amounts of one or more colorants into the mixing tank 62. The field device 44 may include sensing facilities and control logic (e.g., confirm logic) that generates failure information in response to the failure of the colorant dispenser 66 to respond properly to commands and/or control signals sent by the field device 44. For example, if the field device 44 sends a signal to the colorant dispenser 66 to open a valve within the dispenser 66 and the field device 44 detects (via wires, communications, etc.) that the valve has not opened or that the valve is stuck open, the field device 44 may generate appropriate failure information that is passed to the controller 36.

Due to the large number of field devices and control parameters that are typically associated with a process control system, the batch executive function and/or the unit modules may potentially have to process and manage an impractically large amount of failure information which is collected from the relatively large number of devices, control loops, etc. that are distributed throughout the process control system. Conventional systems, for example, require the batch executive or some other failure management routine (e.g., failure management logic within a unit phase) to simultaneously monitor the operational status of every field device that could potentially be used by the system to carry out a batch process, regardless of whether or not a particular device is needed by the process (or phase) currently being executed. In practice, the management of such a large amount of failure information by higher level functions such as the batch executive function or unit modules is very difficult. As a result, many system designers/operators may choose to substantially reduce the number of devices within a process control system that the batch executive monitors or that each unit module monitors, thereby increasing the risk that an inferior and/or dangerous product will be unknowingly produced by the system (i.e., failures in unmonitored devices will not be detected). Alternatively, system designers may choose to monitor virtually every device and control parameter within a process control system, thereby greatly increasing the frequency with which a process is stopped in response to an error or failure that would otherwise have no impact on the quality of the product produced by the system.

As will be discussed in greater detail below, the hierarchical failure management technique described herein substantially reduces the amount of failure information that the batch executive function (and/or the failure management logic within a unit phase) must process at any given time during the execution of a batch process. More specifically, the hierarchical failure management technique described herein incorporates function blocks within control modules (which are at the module level of the equipment hierarchy) that generate composite failure codes and that automatically send these composite failure codes to the unit level of the equipment hierarchy at times when the composite failure codes correspond to modules currently needed by a unit phase to carry out a process being executed. The unit modules (which are at the unit level) incorporate functions that further process these composite failure codes to determine whether a currently executing batch process can continue or whether the batch process should be stopped. In this manner, a unit module can employ relatively simply control logic that processes relatively few composite failure codes to determine whether a batch process should continue or whether the currently executing batch process should be halted. Of course, a portion or all of the failure information processed at the unit level may also be passed up to the batch executive function. The batch executive function may then use this information to make an independent determination of whether a process should continue or whether equipment should be reallocated to avoid a failed device or equipment and to avert a stoppage of the batch currently being executed. Further, because each of the composite failure codes may be formed based on a large number of device status conditions and control loop parameter conditions, a system designer or system operator does not have to forego monitoring of devices and/or control parameters to make the implementation of failure management logic within a complex process control system practical. To the contrary, the consolidation of failure information within composite failure codes enables the process control system to more efficiently manage a relatively large amount of failure information. Still further, because the hierarchical failure management technique described herein sends composite failure codes up to the unit level (and, if desired, up to the batch executive) that are associated with a currently executing phase or step within a phase of the batch process, the failure management technique described herein effectively time filters failure information, thereby greatly reducing the amount of failure information that the failure management logic must process at any given phase or step (i.e., time interval) during the execution of a process.

Figure 2:
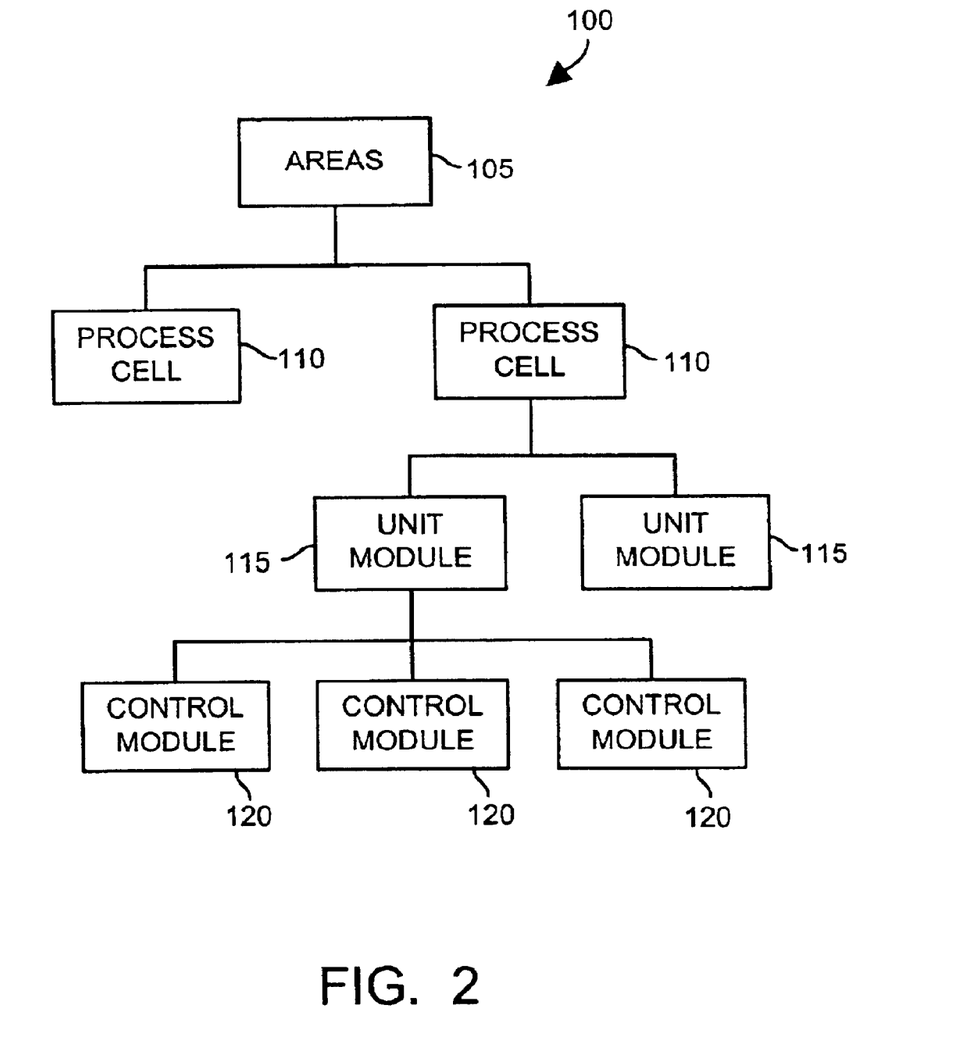
FIG. 2 is a block diagram of a hierarchical equipment model that may be used to develop a complex process control algorithm for execution by the process control system shown in FIG. 1.

Before discussing more specific aspects of the hierarchical failure management technique, a brief discussion of the hierarchical relationships between the physical equipment within the process control system 10 and the various levels of abstraction associated with the process control algorithm, which is executed by the system 10, are discussed below in connection with FIGS. 2 and 3. FIG. 2 is a block diagram that depicts a hierarchical equipment model 100, which represents the physical relationships between the various levels of control and physical activities within the process control system 10. The model 100 shown in FIG. 2 is based on the well-known SP-88 equipment hierarchy, however, other hierarchical models could be used instead without departing from the scope and the spirit of the invention.

At the highest levels of the hierarchical model 100 are areas 105 and process cells 110. Areas 105 and process cells 110 are essentially geographic in nature and represent physical locations within the process control system 10. Typically, areas 105 are associated with a building or a plant, whereas process cells 110 are associated with locations within a building or plant that are producing a particular type of product. For example, the system 10 shown in FIG. 1 may physically correspond to an area, which may be a paint production facility including a plurality controllers, some of which are shown in FIG. 1 (i.e., controllers 36 and 38) and some of which are not shown, a plurality of field devices, various pieces of equipment, client stations, etc. The controllers 36 and 38, along with the field devices 40–50, 60 and 61, the I/O devices 52 and 54, and the equipment 62–71, on the other hand, may collectively correspond to a process cell that blends one or more batches of paint.

Unit modules 115 within the hierarchical model 100 typically correspond to a particular piece of equipment, together with any sensors, actuators, etc. that work in conjunction with that equipment. For example, the controller 36 (FIG. 1), the field devices 40–44 and 60 connected thereto, the mixing tank 62, the blender 64 (which mixes the contents of the tank 62), the base dispenser 63, and the colorant dispenser 66 (which can add one or more colorants to the mixture within the tank 62) may collectively correspond to a unit module or unit (i.e., a paint mixing unit). Likewise, the controller 38, the field devices 46–50 and 61, the mixing tank 71, the blender 70, the base dispenser 69, and the colorant dispenser 68, may collectively correspond to another unit.

Control modules 120 within the hierarchical module 100 typically correspond to low-level regulatory control functions such as, for example, proportional, integral, and/or derivative control functions. While control modules are, at least conceptually, primarily functional in nature, control modules receive inputs from sensors and/or other modules (which are typically used to provide the feedback signal needed to accomplish a closed loop control) and process these inputs to achieve desired control loop conditions (e.g., a setpoint) using a predetermined control algorithm that provides appropriate outputs to actuators, heaters, motors, etc. For example, with reference to FIG. 1, the field device 60 (which may be a level sensor), the base dispenser 63 and the field device 42 may cooperate with a control module to control the level of base paint mixture which is added to the mixing tank 62 by the base dispenser 63. The control algorithm associated with this control module may be instantiated within the smart field device 42 or, alternatively, may be instantiated within the controller 36. Of course, because control modules 120 are an abstraction, the corresponding physical components of control modules 120 may overlap in practice so that, for example, one piece of equipment may interact with a plurality of control modules or multiple control modules may be needed to operate a single piece of equipment.

The hierarchical equipment model 100 shown in FIG. 2 may be used to facilitate the development of various software objects which, when instantiated within the workstations 12 and 14, the controllers 36 and 38 and/or the smart field devices 40–50, enable the process control system 10 to produce batches of paint. As is well known, object-oriented programming techniques may be used to develop a highly complex control algorithm in a modular fashion such that individual objects or modules can be independently developed. As is also well known, these modules or software objects can communicate with one another by exchanging parameter values and may be nested within one another to form highly complex control functions or control procedures.

When modeling a process control system, such as the system 10 shown in FIG. 1, using the hierarchical model 100 shown in FIG. 2, a system designer can readily develop hierarchically related software objects that correspond to the various control modules, unit modules, process cells, etc. that make up that process control system. By way of example only, when viewing the system 10 shown in FIG. 1 in this manner, the system designer may recognize that a module for opening a valve for a specified amount of time, such as valves within the colorant dispensers 66 and 68, is needed. Here, the system designer may develop an object that receives parameters such as valve open/close status, open duration, valve ID, etc. and that, in response to the values received for these parameters, provides an output which causes a particular valve to open for specified period of time, thereby dispensing a predetermined amount a specific colorant. Of course, this valve open object may be used to perform the function of any other control module within the process control system 10 that requires the timed activation of a valve. Further, the system designer may recognize that a unit level software object is needed to call the valve open object. This unit level software object may receive parameters that indicate colorant amount, colorant type, etc. (from a batch executive, for example) to carry out a colorant dispense function. The colorant dispense object may, in turn, call the valve open object and provide the appropriate valve status, open duration, and valve ID parameter values so that the appropriate type and amount of colorant is dispensed into the mixing tank 62. In any event, it can be seen from the foregoing discussion that the hierarchical model 100 shown in FIG. 2 may be used to facilitate the development of a hierarchy of modular software objects which cooperate to carry out a complex control process.

Figure 3:
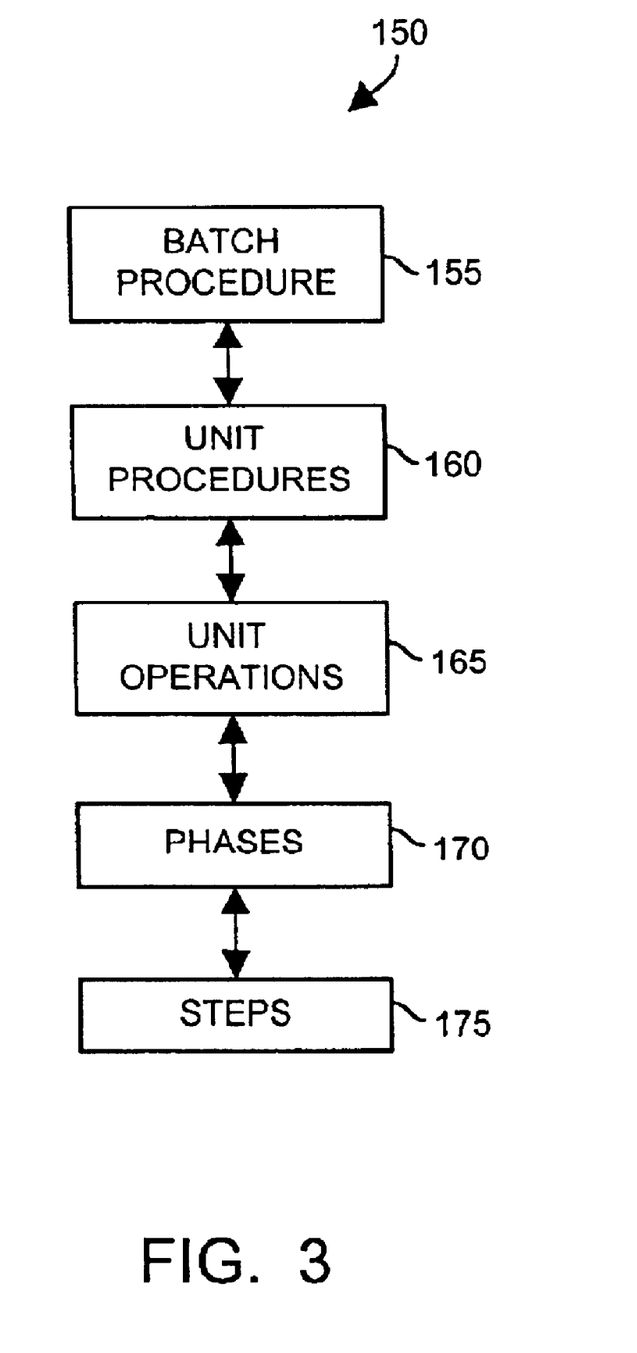
FIG. 3 is a block diagram that represents various levels of abstraction within a complex process control algorithm.

FIG. 3 is a block diagram 150 representing the various levels of abstraction within a complex batch process control algorithm. Generally speaking, a batch process control algorithm is a high-level program that, when executed by a batch executive, causes a sequenced instantiation of software objects associated with the unit modules and control modules that are needed to carry out the high-level batch commands. For example, with reference to FIG. 1, a batch procedure for producing 100 gallons of midnight blue latex paint may specify adding one pint of a specific blue colorant to the mixing tank 62. During execution of the batch process, the batch executive may, for example, instantiate an ADD_COLORANT object within the controller 36 (which is at the unit level of the equipment hierarchy) and may pass parameters to the ADD_COLORANT object within the controller 36 specifying the blue colorant and the amount of the blue colorant to be added. The ADD_COLORANT object may, in turn, call a VALVE_OPEN object, which may be instantiated within the smart field device 44, and may pass parameters to the VALVE_OPEN object specifying the valve ID, that the valve should be opened, and the duration for which the valve should be held open. In response to receiving the parameters from the ADD_COLORANT object, the VALVE_OPEN object within the field device 44 causes the field device 44 to send an output to the colorant dispenser 66 that opens a valve within the colorant dispenser 66 to dispense the desired amount of the desired blue colorant into the mixing tank 62.

In practice, the execution of a batch procedure may involve successive instantiations of hierarchically related software objects. More specifically, as shown in FIG. 3, a batch procedure 155 may invoke one or more unit procedures 160 and unit operations 165, which are software objects that are typically instantiated within the unit level (e.g., a controller) of a process control system. Generally speaking, unit procedures and operations are objects which are related to the operation and/or control of a particular type of equipment. Phases 170, on the other hand, are generally related to a type of action that a particular piece of equipment can carry out. For example, the phases associated with the production of a batch of paint may be ADD_COLORANT, MIX, STIR, BLEND, FILL_BASE, etc. Each of these phases may, in turn, be composed of one or more steps 175, which are executed in a sequenced manner according to an algorithm. Steps 175 reside at the control module level of the system hierarchy, and each step typically calls a software object or objects associated with a control module. For example, a MIX phase may include one or more steps that cause one of the blenders 64 and 70 to turn on an off in a predetermined manner (i.e., according to the algorithm) to accomplish an efficient mixing of the paint within the mixing tanks 62 and 71.

As the phases 170 and the steps 175 within the phases 170 are executed by the process control system 10, inputs may be required from sensors, equipment may be required to perform actions, control parameters may be required to be within a desired target range, etc. before the control process can proceed. Thus, sensor failures that result in no input or an unacceptably inaccurate input, the failure of equipment to carry out a requested action and/or the failure of control parameters to fall within an acceptable range may require the process to be stopped to prevent damage to equipment, production of an inferior or dangerous product, and/or to enable a system operator to intervene to remedy the failure before continuing the process.

The process control system 10 shown in FIG. 1 uses a completely integrated equipment hierarchy (as generally depicted in FIGS. 2 and 3) to automatically pass composite failure information containing device failures and control errors or any other failure information which is collected at the control module level up to the unit module level of the system hierarchy. This integrated hierarchy enables a unit module to register with the various control modules that may be subservient to that unit module (or any other control module within the system 10, which may not be subservient to that unit module) to automatically receive failure information from those control modules. As a result, a phase running within a unit module may automatically receive failure information associated with the control modules that carry out the steps of that phase or control modules that are not subservient to the phase but which can affect the execution of phase steps. The phase may then process the failure information to determine whether the process can continue (i.e., whether the current step and/or further steps can be executed). Of course, failure information processed by phases within a unit module may also be passed up to the batch executive running within the workstation 14 and the batch executive may then report the failures to the system operator via a graphical user interface, for example. Additionally, the batch executive may take further actions to reallocate equipment to work around the failure and/or may await for further instructions from the system operator before proceeding.

Figure 4:
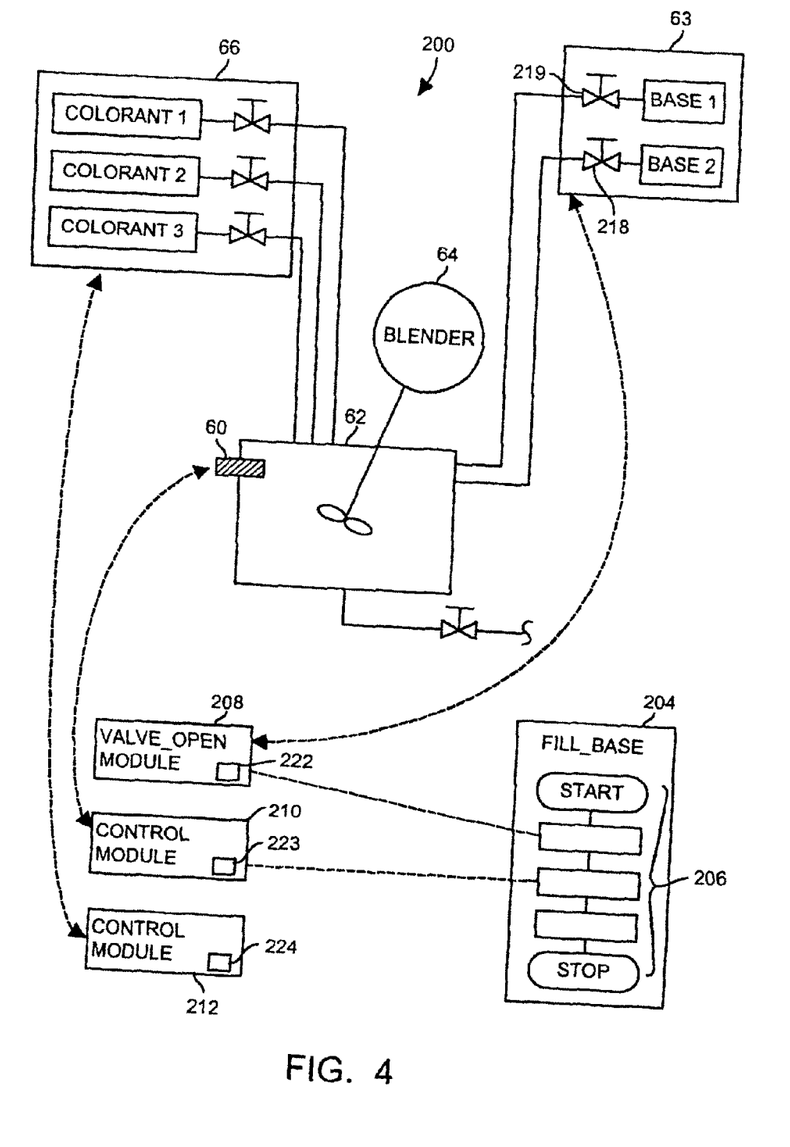
FIG. 4 is an exemplary schematic block diagram that illustrates the run-time communication relationships between unit modules, control modules, phases and steps within the process control system shown in FIG. 1.

FIG. 4 is a schematic block diagram illustrating in greater detail the manner in which the phases and steps of a process control algorithm may interact at the unit module and control module levels of the process control system 10 (FIG. 1). In particular, a paint mixing unit 200 associated with the controller 36 (FIG. 1) is shown in FIG. 4. During the execution of a batch process, the batch executive function may invoke a unit procedure/operation to fill the mixing tank 62 with a predetermined quantity of paint base. Typically, but not necessarily, the unit procedure is instantiated within the controller 36. The unit procedure, in turn, invokes a FILL_BASE phase 204, which is also typically instantiated within the controller 36, by passing parameters such as base_type and base_quantity to the FILL_BASE phase 204. As shown in FIG. 4, the FILL_BASE phase 204 may include one or more steps 206, each of which may be carried out by invoking one or more of control modules 208–212. For example, the FILL_BASE phase 204 may include a step that turns on a valve within the base dispenser 63 for a predetermined amount of time so that the desired quantity of a particular base is added to the mixing tank 62. This step may pass parameters such as valve_ID, open/close status, and duration to the VALVE_OPEN module 208 (which may be instantiated within the field device 42) to carry out the desired action. In particular, the VALVE_OPEN module 208 may cause the field device 42 to provide an output that opens an appropriate one of valves 218 and 219 within the base dispenser 63 for an appropriate amount of time so that the desired paint base is added to the mixing tank 62. Of course, the FILL_BASE phase 204 may include further steps such as a step that stirs the base once it has been added to the mixing tank 62, a step that checks the level of the base using the level sensor 60, etc. as needed.

The FILL_BASE phase 204 may also explicitly register interest in non-subservient modules, which are not implicitly required to carry out actions for the steps 206 (i.e., the control modules 208–212) but which may nevertheless have an affect on the execution of the FILL_BASE phase 204. By way of example only, the FILL_BASE phase 204 may explicitly register interest in a SPILL module 220, which continuously monitors the plant floor area surrounding the unit 200 to determine whether a relatively large amount of paint (or a paint constituent) has spilled due to, for example, a leaking pipe, valve, tank, etc. Although the steps of the FILL_BASE phase 204 do not control or invoke the SPILL module 220 by sending parameters to it, a system designer may include special safety-related and/or alarm steps to the FILL_BASE phase 204 that are responsive to the SPILL module 220. For example, if the FILL_BASE phase 204 determines via the SPILL module 220 that a large amount of paint has spilled, the FILL_BASE phase 204 may immediately close all currently open valves and send an alarm to the system operator indicating that a spill has occurred.

In addition to carrying out actions invoked by phase steps or providing explicitly required status information, the modules 208–212 and 220 may include respective logic 222–226 that monitors the operational status of equipment controlled by each module, the values of process variables as compared to a predetermined operating range (e.g., a setpoint or control range), or any other failure information desired. Because the equipment hierarchy of the process control system 10 is fully integrated, the failure information collected by each of the modules 208–212 and 220 can, if desired, be automatically propagated up to the unit 200. Thus, each phase may, on a step by step basis, process the failure information associated with the module or modules that carry out that step to determine if the step can proceed. In this manner, neither the phase nor the batch executive has to directly monitor and process all of the failure information on a system-wide basis, as was the case with prior systems. Instead, each phase can determine for each step whether the process can continue by processing only the failure information that pertains to that step at the time the step is executed (or immediately prior to the time that the step is executed). The batch executive may then receive, for example, a message from a phase that the process has been stopped, or may, alternatively, receive a message to take some other action if a failure has been detected but the process was not stopped as a result of the failure.

Figure 5:
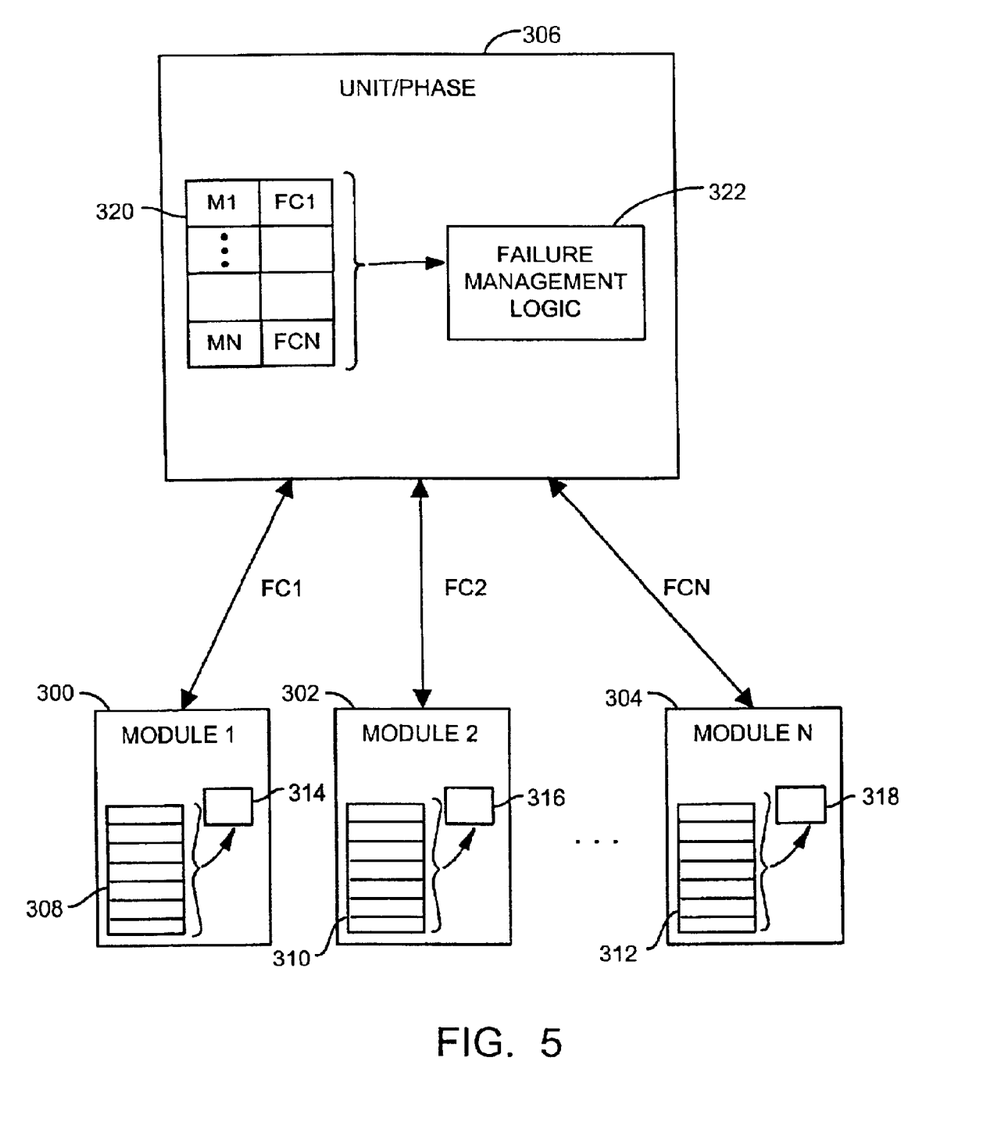
FIG. 5 is an exemplary block diagram that illustrates one manner in which composite failure codes may be automatically passed from a control module to a unit module.

FIG. 5 is an exemplary schematic block diagram that illustrates the manner in which control modules propagate failure information up to unit phases and the manner in which the unit phases may further process this failure information to determine whether or not the currently executing batch process should be stopped or whether some other action should be taken by the system operator. As shown in FIG. 5, a plurality of control modules 300–304 are associated with a phase running within a unit 306. The steps of the phase may send parameters to one or more of the control modules 300–304 that are subservient to the unit 306 in a particular sequence at particular times to cause the modules 300–304 to carry out actions (e.g., to cause a piece of equipment to execute an action) that carry out the desired batch process. Alternatively or additionally, the phase may explicitly register interest in one or more of the control modules 300–304 that are not subservient to the unit 306 but which may affect the execution of one or more phase steps. In any event, each of the control modules 300–304 can automatically pass information such as, for example, requested failure information, to the unit phases. In particular, the control modules 300–304 include respective lists of failure information 308–312. Each of the lists 308–312 includes failure information related to sensors, equipment, process control variables, etc. that are needed by a respective one of the control modules 300–304 to perform its function. For example, the lists of failure information 308–312 may include an indication that a sensor is no longer functioning, that a valve is stuck open or closed, that a control parameter has fallen outside of a predetermined range of values, or any other information that relates to the operational status of a piece of equipment and/or a control loop needed to carry out module functions.

Importantly, the control modules 300–304 further include respective logic 314–318 that processes the failure information contained in the lists 308–312 to form a composite failure code for each of the control modules 300–304. Generally speaking, the composite failure codes are formed and sent by each of the control modules 300–304 to the unit 306 as the unit phase enters or is about to enter a step that needs (i.e., implicitly requires the module to carry out actions or explicitly requires the module for safety purposes or any other purpose) that particular control module so that the unit phases can more quickly and easily process composite failure information associated with a relatively large number of devices, equipment, etc.

The composite failure codes may be generated using a variety of techniques. For example, each item within the lists of failure information 308–312 may be assigned a numerical value that reflects the type and the severity of that particular failure information. The numerical values within each of the lists 308–312 may then be mathematically combined to form a composite failure code for that module. For example, the numerical values within the lists 308–312 may be summed using weighting coefficients, if desired. Alternatively or additionally, the numerical values may be multiplied, subtracted and/or processed using any desired linear function, non-linear function, discontinuous function, etc. Of course, the failure information within each list may be combined in any other manner to produce a composite failure code without departing from the scope and the spirit of the invention.

Further, some types of failures may be given greater or lesser numerical values based on the presence or absence of another failure in the list. In the case of a pair of redundant sensors, for example, the failure of one of the pair of sensors may result in one numerical value being assigned to the failed sensor in the list, whereas the failure of both sensors may cause higher numerical values to be assigned to both failures within the list. Still further, the numerical value assigned to each failure may be based on the type of product being produced by the process control system. For example, in the case of a process control system that produces batches of paint, generally lower numerical values may be assigned to failures within the lists 308–312, whereas in the case of a process control system that produces pharmaceutical products, generally higher numerical values may be assigned to failures within the lists 308–312.

The failure codes generated by each of the control modules 300–304 are passed up to the unit 306 and maintained in a dynamic failure code list 320 within the unit 306. The phase currently being executed within the unit 306 directs the unit 306 to include in the failure code list 320 only those failure codes from modules that are implicitly required to carry out a step of the phase and failure codes from modules that the user has explicitly required to be monitored during a step of the phase. The phase includes failure management logic 322, which is described by way of example in connection with FIG. 7 below, that processes the failure codes in the failure code list 320 to determine whether the process being executed should continue or whether the some other action should be taken.

Figure 6:
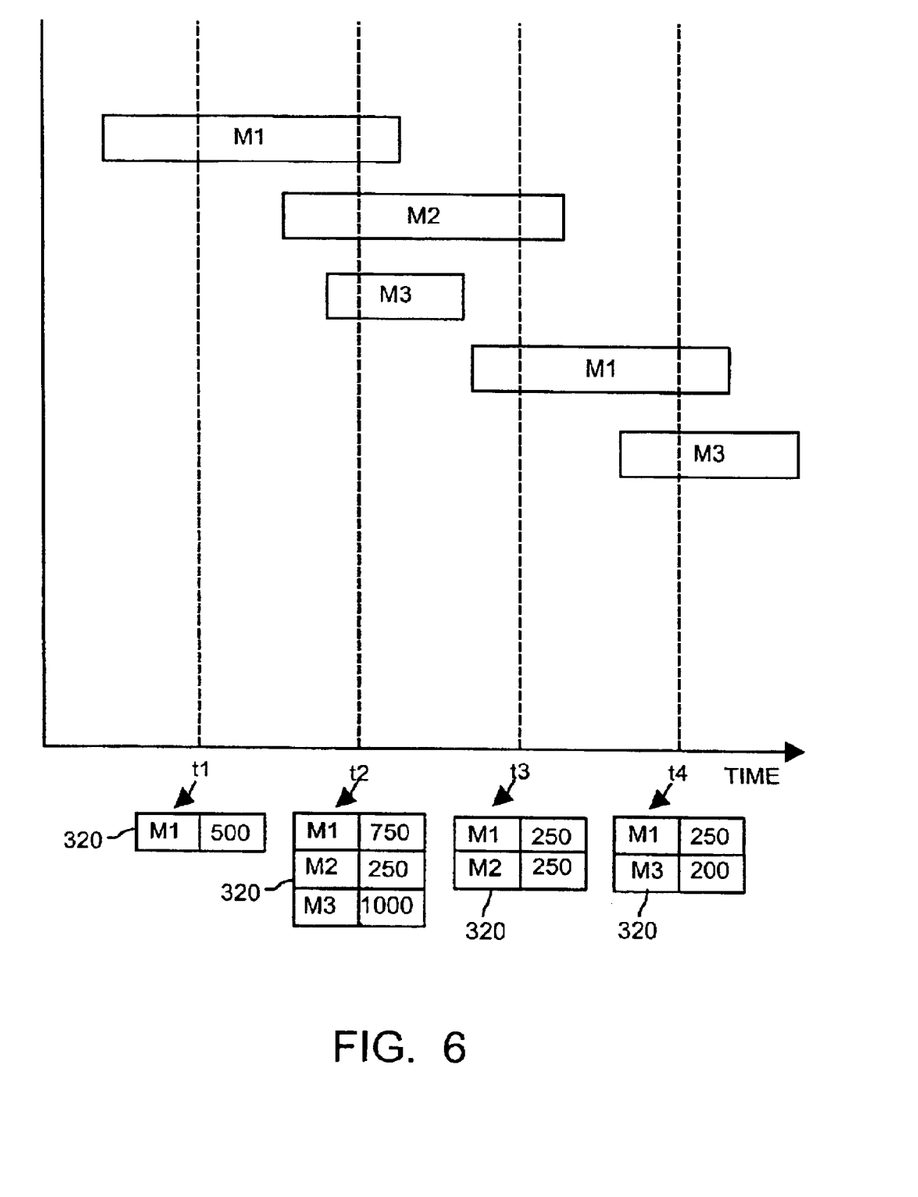
FIG. 6 is an exemplary graphical depiction of the manner in which a composite failure code list within a unit module may change over time.

FIG. 6 graphically depicts, by way of example only, the manner in which the failure code list 320 within the unit 306 shown in FIG. 5 may change over time (i.e., as a process progresses). As can be seen in FIG. 6, at time t1 the step being executed by the unit phase only uses module 1 (M1). Thus, the unit failure code list 320 includes only the current composite failure code (which is shown by way of example to have a numerical value of 500) for M1. Similarly, at times t2, t3 and t4, the contents of the unit failure code list 320 dynamically changes so that modules which are not currently needed by the phase are not included in the failure code list 320. For example, at time t2 the unit phase uses modules one, two and three (i.e., M1, M2 and M3) and the unit failure code list 320 includes the respective composite failure codes 750, 250 and 1000. As can be seen in FIG. 6, the group of modules having composite failure codes within the unit failure code list 320 changes over time. Further, the numerical value of the composite failure code provided by a particular module may change over time. For example, M1 is a member of the group of modules having composite failure codes in the unit failure code list 320 for times t1–t4, however, the numerical value of the composite failure code provided by M1 ranges from 250 to 750 over t1 to t4.

Figure 7:
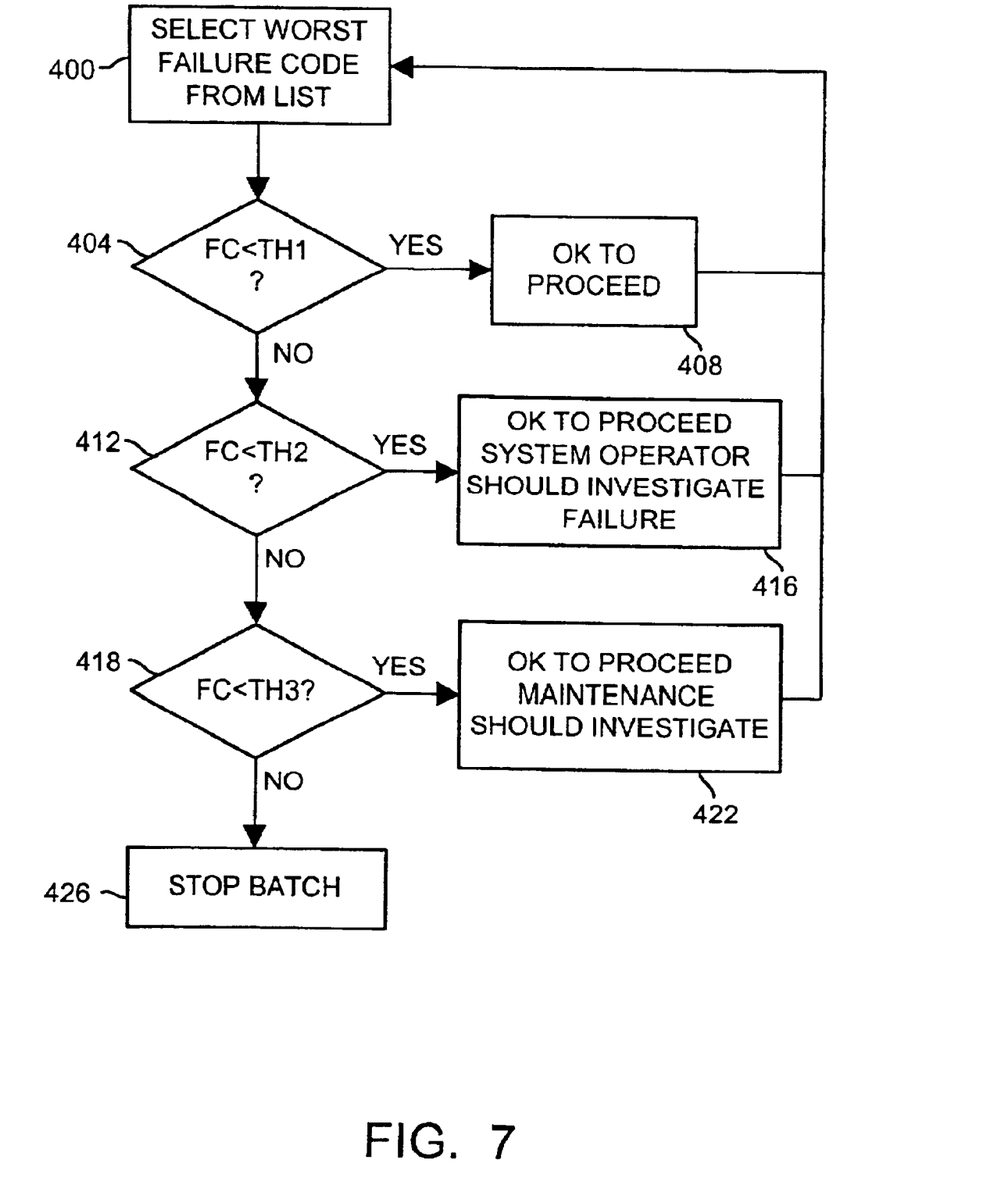
FIG. 7 is an exemplary flow diagram that depicts one manner in which a unit module may process a list of composite failure codes to determine whether a process should proceed.

FIG. 7 is an exemplary flow diagram that illustrates one manner in which the failure management logic 322 of the phase shown in FIG. 5 may process the failure codes within the failure code list 320. Block 400 selects the worst failure code from the failure code list 320. The worst failure code in this example is the failure code having the largest numerical value because, in this example, modules are configured to assign higher numerical values to more severe failures. However, alternative processing techniques could select the failure code having the smallest numerical value in the case where modules assign lower numerical values to more severe failures. In any case, block 404 determines whether the worst failure code is less than a first threshold value (TH1). If the worst failure code is less than the first threshold value, then the failure management logic 322 enters block 408 and determines that the process can proceed. On the other hand, if the worst failure code is greater than the first threshold value, the failure management logic 322 enters block 412. Block 412 determines whether the worst failure code is less than a second threshold (TH2) value and, if the worst failure code is less than the second threshold value failure management logic 322 enters block 416. Block 416 indicates that the process can proceed but that the composite failure code is sufficiently large to merit further investigation by the system operator. It is important to recognize that the unit 306 may report the need for investigation to the batch executive which, in turn, may display appropriate instructions via a graphical user interface to the system operator. On the other hand, if the worst composite failure code is not less than the second threshold value, then the failure management logic 322 enters block 418. Block 418 determines whether the worst composite failure code is less than a third threshold value (TH3) and, if the worst failure code is less than the third threshold value the failure management logic 322 enters block 422. Block 422 indicates that the execution of the batch process can proceed but that the composite failure code is sufficiently large to merit the dispatch of a maintenance person to investigate the failure. If the worst composite failure code is greater than the third threshold value, then the failure management logic 322 enters block 426 and automatically stops the batch from executing.

The numerical values for the first through third threshold values shown in FIG. 7 may be selected based on the type of product being produced, the parameters of the process control system, the product quality goals, etc. For example, production of pharmaceutical products and high quality paint products may generally require lower threshold values to guarantee that even relatively minor problems will result in the stoppage of a batch. On the other hand, low quality paint products, for example, may enable higher threshold values to be used to minimize the probability of a batch stoppage to keep production costs low. Furthermore, while three threshold values are discussed in connection with FIG. 7, more or fewer threshold values could be used instead without departing from the scope and the spirit of the invention. Still further, the troubleshooting instructions/suggestions to investigate, etc. may be varied as desired to suit a particular application.

Although the failure management logic 322 described in connection with FIG. 7 is described as being executed within the unit 306, the batch executive function (which in this example is running within the workstation 14 shown in FIG. 1) could alternatively perform some or all of the failure management activities. Alternatively or additionally, some or all of the failure management activities could be performed by one or more software routines running within the server 16. In any event, if the unit 306 performs the failure management activities, the unit 306 will preferably, but not necessarily, report to the batch executive function. For example, when the unit failure management logic 322 determines that further investigation to determine the cause of a high value failure code is merited, such a determination is reported to batch executive, which may then convey that message to the system operator via the user interface.

The hierarchical failure management technique described herein automatically passes failure information from control modules to units at a time when that information is needed by the unit to determine whether or not the process currently being executed can continue. Further, the hierarchical failure management technique generates composite failure codes at the control module level, which are passed to units to be processed by the failure management logic within the units. These composite failure codes enable a relatively large amount of failure information to be used to quickly determine at the unit level whether or not a process can continue operating. Still further, the hierarchical failure management technique described herein minimizes or may eliminate the occurrence of unnecessary process stoppages in response to non-critical failures or in response to failures in connection with devices and/or equipment that is not currently needed to carry out the phase of the process being executed.

If implemented in software, the functional blocks and routines discussed herein may be stored in any computer readable memory such as on a magnetic, an optical, or other storage medium, in a RAM or ROM of a computer, controller, field device, etc. Likewise, this software may be modulated on a carrier and delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and the scope of the invention.

What is claimed is:

1. A method of managing failures for use in a process control system having a unit module and a plurality of control modules communicatively coupled to the unit module that carry out a process, the method comprising:

collecting failure information within each of the control modules;

generating a composite failure code within each of the control modules based on the failure information within each control module;

automatically sending a group of composite failure codes to the unit module; and determining whether the process should be stopped based on the group of composite failure codes.

2. The method of claim 1, wherein collecting failure information within each of the control modules includes generating a list of failures within each of the control modules.

3. The method of claim 2 wherein generating the list of failures includes storing failure information associated with one or more of a control loop, sensor and actuator that carry out actions for the control modules.

4. The method of claim 1, wherein generating the composite failure code within each of the control modules based on the failure information within each control module includes mathematically combining the failure information within each control module.

5. The method of claim 4, wherein mathematically combining the failure information includes calculating a weighted sum using the failure information.

6. The method of claim 1, wherein automatically sending the group of composite failure codes to the unit module includes selecting the group of composite failure codes based on a phase of the unit module.

7. The method of claim 6, wherein selecting the group of composite failure codes based on the phase of the unit module includes selecting the group of composite failure codes based on a current phase of the unit module.

8. The method of claim 6, wherein selecting the group of composite failure codes based on the current phase of the unit module includes the step of selecting a composite failure code associated with a non-subservient control module.

9. The method of claim 8, wherein selecting the composite failure code associated with the non-subservient control module includes selecting a failure code based on an explicit request to include the non-subservient module in the current phase of the unit module.

10. The method of claim 1, wherein determining whether the process should be stopped based on the group of composite failure codes includes selecting one composite failure code from the group of composite failure codes and comparing the one selected composite failure code to a first predetermined threshold value associated with a determination of whether the process should be stopped.

11. The method of claim 10, further comprising comparing the one selected composite failure code to a second predetermined threshold value associated with a determination that the process should continue.

12. The method of claim 10, wherein selecting the one composite failure code from the group of composite failure codes includes selecting a worst composite failure code.

13. The method of claim 12, wherein selecting the worst composite failure code includes selecting a composite failure code having the highest numerical value.

14. A method of managing failures for use in a process control system having a unit module and a control module communicatively coupled to the unit module that carry out a process, the method comprising:
collecting failure information within the control module;
generating a composite failure code within the control module based on the failure information within the control module;
automatically sending the composite failure code to the unit module; and
determining whether the process should be stopped based on the composite failure code.

15. The method of claim 14, wherein generating the composite failure code within the control module based on the failure information within the control module includes mathematically combining the failure information within the control module.

16. The method of claim 15, wherein mathematically combining the failure information includes calculating a weighted sum using the failure information.

17. The method of claim 14, wherein determining whether the process should be stopped based on the composite failure code includes comparing the composite failure code to a predetermined threshold value.

18. A system that manages failures for use with a process control system having a processor and a unit module and a plurality of control modules communicatively coupled to the unit module, the system comprising:
a computer readable medium;
a first routine stored on the computer readable medium and adapted to be executed by the processor that collects failure information within each of the control modules;
a second routine stored on the computer readable medium and adapted to be executed by the process that generates a composite failure code within each of the control modules based on the failure information within each control module;
a third routine stored on the computer readable medium and adapted to be executed by the processor that automatically sends a group of composite failure codes to the unit module; and
a fourth routine stored on the computer readable medium and adapted to be executed by the processor that determines whether the process should be stopped based on the group of composite failure codes.

19. The system of claim 18, wherein the first routine is further adapted to generate a list of failures within each of the control modules.

20. The system of claim 19, wherein the first routine is further adapted to store failure information associated with one or more of a control loop, sensor and actuator that carry out actions for the control modules.

21. The system of claim 18, wherein the second routine is further adapted to mathematically combine the failure information within each of the control modules.

22. The system of claim 21, wherein the second routine is further adapted to calculate a weighted sum using the failure information.

23. The system of claim 18, wherein the third routine is further adapted to select the group of composite failure codes based on a phase of the unit module.

24. The system of claim 23, wherein the third routine is further adapted to select the group of composite failure codes based on a current phase of the unit module.

25. The system of claim 18, wherein the fourth routine is further adapted to select one composite failure code from the group of composite failure codes and compare the one composite failure code to a first predetermined threshold value associated with a determination of whether the process should be stopped.

26. The system of claim 25, wherein the fourth routine is further adapted to compare the one composite failure code to a second predetermined threshold value associated with a determination that the process should continue.

27. The system of claim 25, wherein the fourth routine is further adapted to select a worst composite failure code from the group of composite failure codes.

28. The system of claim 27, wherein the fourth routine is further adapted to select a composite failure code having the highest numerical value to be the worst composite failure code.

29. A device that manages failures for use in a process control system having a unit module and a plurality of control modules communicatively coupled to the unit module that carry out a process, the device comprising:

a controller having a memory and a processor communicatively coupled to the memory, wherein the controller is programmed to use composite failure codes to determine whether the process should be stopped; and wherein the controller is further programmed to determine whether the process should be stopped based on composite failure codes that are associated with ones of the control modules that are currently needed by the unit module to carry out the process.

30. The device of claim 29, wherein the controller is further programmed to select one of the composite failure codes and to compare the one selected composite failure code to a predetermined threshold value to determine whether the process should be stopped.

31. The device of claim 30, wherein the controller is further programmed to select a worst composite failure code to be the one selected composite failure code.

32. A process control system for carrying out a process, the process control system comprising:

a plurality of field devices;

a controller communicatively coupled to the plurality of field devices and including a unit module that carries out at least a portion of the process, wherein the unit module causes the controller to process a group of composite failure codes to determine whether the process should be stopped;

wherein the group of composite failure codes is generated by a plurality of control modules, and wherein the plurality of control modules are instantiated within the controller.

33. The process control system of claim 32, wherein each of the control modules uses a list of failures to generate its respective composite failure code.

34. The process control system of claim 32, wherein the unit module causes the controller to select the group of the composite failure codes based on a current phase of the process.

35. The process control system of claim 32, wherein each of the control modules automatically sends its respective composite failure code to the controller.

36. A process control system for carrying out a process, the process control system comprising;

a plurality of field devices;

a controller communicatively coupled to the plurality of field devices and including a unit module that carries out at least a portion of the process, wherein the unit module causes the controller to process a group of composite failure codes to determine whether the process should be stopped;

wherein the group of composite failure codes is generated by a plurality of control modules, and wherein the list of failures includes numerical values associated with one or more failures and wherein each of the field devices mathematically combines the numerical values within its respective list of failures to generate its respective failure code.

37. The process control system of claim 36, wherein each of the control modules mathematically combines the numerical values within its respective list of failures by calculating a weighted sum of the numerical values.

38. A process control system for carrying out a process, the process control system comprising:

a plurality of field devices;

a controller communicatively coupled to the plurality of field devices and including a unit module that carries out at least a portion of the process, wherein the unit module causes the controller to process a group of composite failure codes to determine whether the process should be stopped; and wherein the controller processes the group of the composite failure codes by selecting a worst failure code from the group of the composite failure codes and comparing the worst failure code to a predetermined threshold associated with a determination of whether the process should be stopped.

39. The process control system of claim 38, wherein the controller selects a failure code having the highest numerical value from the group of the composite failure codes to be the worst failure code.

* * * * *

UNITED STATES PATENT AND TRADEMARK OFFICE
CERTIFICATE OF CORRECTION

PATENT NO. : 6,871,299 B2
DATED : March 22, 2005
INVENTOR(S) : Robert B. Havekost et al.

It is certified that error appears in the above-identified patent and that said Letters Patent is hereby corrected as shown below:

Title page,
Item [75], Inventors, add -- Michael G. Ott, Austin, TX (US) --.

Column 9,
Line 36, insert -- of -- after "plurality".

Column 11,
Line 44, delete "an" and insert -- and --.

Column 17,
Line 5, delete "claim 2" and insert -- claim 2, --.

Column 20,
Line 2, delete "comprising;" and insert -- comprising: --.

Signed and Sealed this

Third Day of January, 2006

JON W. DUDAS
*Director of the United States Patent and Trademark Office*